C. E. TREASE.
HARROW.
APPLICATION FILED JUNE 5, 1908.
900,133.
Patented Oct. 6, 1908.
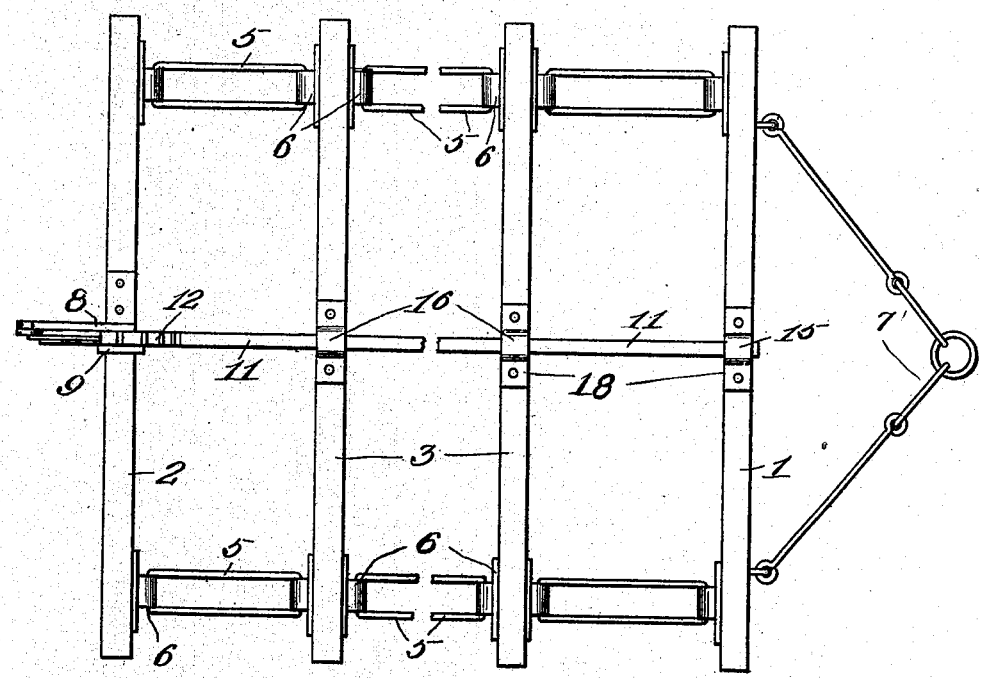
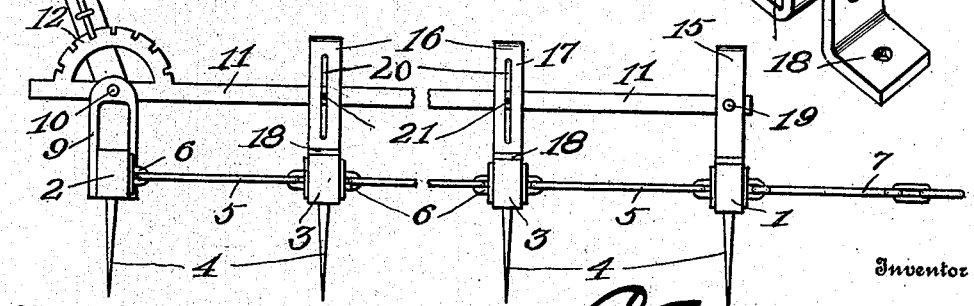
Witnesses
James F. Crown
M. S. Skinner
Inventor
C. E. Trease
By Watson E. Coleman
Attorney

UNITED STATES PATENT OFFICE.

CHARLES E. TREASE, OF VALLEY SPRINGS, ARKANSAS.

HARROW.

No. 900,133.     Specification of Letters Patent.     Patented Oct. 6, 1908.

Application filed June 5, 1908. Serial No. 436,915.

*To all whom it may concern:*

Be it known that I, CHARLES E. TREASE, a citizen of the United States, residing at Valley Springs, in the county of Boone and State of Arkansas, have invented certain new and useful Improvements in Harrows, of which the following is a specification, reference being had to the accompanying drawings.

My invention relates to improvements in harrows of that class in which a plurality of tooth bars are flexibly connected and adapted to be simultaneously adjusted to set the teeth at different angles.

The object of the invention is to provide a harrow of this character with improved means for connecting and adjusting the tooth bars.

With the above and other objects in view, the invention consists of the novel features of construction and combination and arrangement of parts hereinafter fully described and claimed, and illustrated in the accompanying drawings, in which Figure 1 is a plan view of my improved harrow; Fig. 2 is a side elevation; and Fig. 3 is a detail perspective of one of the slotted upright arms or standards on the intermediate bars of the harrow.

The harrow comprises front and rear bars 1, 2 and a plurality of intermediate bars 3, each of said bars having suitable teeth 4 depending from it. The bars are also flexibly connected by open rectangular links 5 the ends of which are pivotally mounted in cast metal bearing brackets 6 secured to the opposing vertical faces of the tooth bars, which latter are preferably constructed of wood and in the form of rectangular beams. Provided upon the front bar 1 is a suitable draft connection 7 for the attachment of a draft animal or animals and secured to the center of the top of the rear bar 2 is an upright hand lever 8. Said lever has a right angularly bent lower end bolted upon the bar 2 and pivoted to it, at 10, at a suitable distance from its lower end, is a longitudinally extending adjusting bar 11 the rear end of which is provided with an upright segmental rack 12 to receive a slidably mounted spring pressed pawl 13 which is controlled by a hand piece 14, the pawl and hand piece being mounted upon the upper portion of the lever, as shown. In order to strengthen the pivot 10, one of its ends is arranged in a U-shaped bracket 9 which straddles the bar 2 and is suitably bolted thereto. The forward portion of the adjusting bar 11 extends over the tops of the beams 1, 3 and through channeled upright arms or standards 15, 16 arranged, respectively, upon the bars 1, 3 and each of which is constructed of a metal strap bent upon itself into U-form and having the ends of its parallel arms 17 bent outwardly to provide attaching flanges 18, which latter are bolted upon the tops of the bars 1, 3, as shown. The forward end of the adjusting bar 11 is pivoted by a transverse bolt or pivot 19 in the standard 15 at a point above the bar 1 corresponding to the distance of the pivot 10 above the bar 2. In the parallel upright portions 17 of the standards 16 on the intermediate tooth bars 3 are formed longitudinal slots 20 which register with each other and receive and guide the projecting ends of transverse pins 21 arranged in the bar 11.

By constructing the standards 16 with the slots 20 and arranging the pins upon the bar 11 so as to project into said slots, it will be seen that the intermediate bars will be permitted to have free vertical movement independent of each other and of the front and rear bars, but they will at the same time be caused to take the same angle as the front and rear bars 1, 2 when the harrow is adjusted by means of the lever 8. The links 5 serve to space the tooth bars apart and at the same time flexibly connect them and the slot and pin connection between the standards 16 and the bar 11, in connection with said links 5, causes the intermediate bars 3 to swing angularly when the harrow is adjusted, but at the same time permits said bars to have independent movement when at any adjusted position.

Having thus described my invention what I claim is:

1. A harrow comprising tooth bars, links flexibly connecting the same, a lever carried by one of the end bars, a standard upon the other end bar, a longitudinal adjusting bar pivoted to the lever and to said standard, slotted standards carried by the intermediate bars, pins projecting from the adjusting bar and adapted to move in the slots in the last mentioned standards, and means for locking the adjusting bar and lever.

2. A harrow comprising tooth bars, links flexibly connecting the same, a lever carried by one of the end bars, a standard upon the other end bar, a longitudinal adjusting bar pivoted to the lever and to said standard, standards upon the intermediate bars, each of the last mentioned standards being formed by a strip of metal bent upon itself to provide parallel arms to receive the adjusting bar between them and formed with longitudinal slots, the ends of said parallel arms being bent outwardly to provide attaching feet to engage the top of the intermediate bars, transverse pins in the adjusting bar and having projecting ends arranged in the slots in the standards on the intermediate bars, a segmental rack upon the adjusting bar, and a pawl upon the lever to engage said rack.

In testimony whereof I hereunto affix my signature in the presence of two witnesses.

CHARLES E. TREASE.

Witnesses:
G. I. JACKSON,
J. R. DUNLAP.